United States Patent Office 2,768,725
Patented Oct. 30, 1956

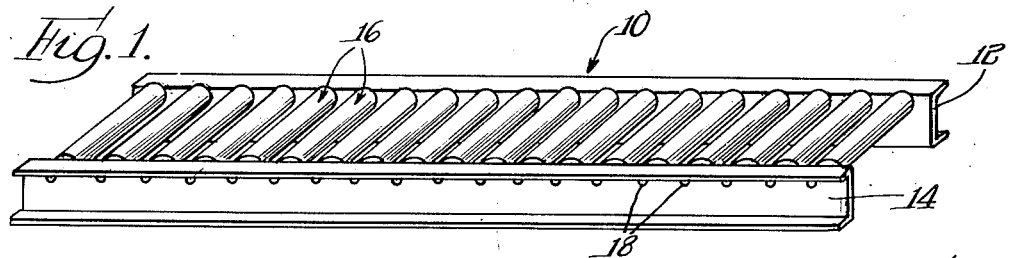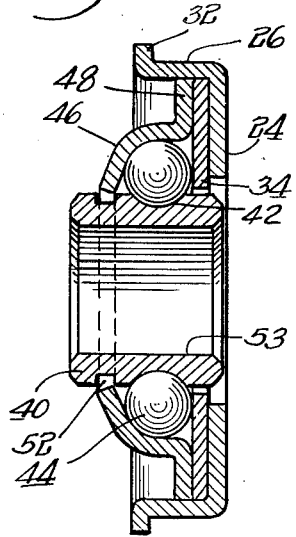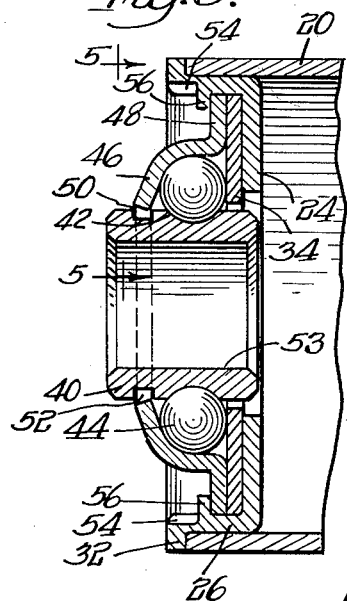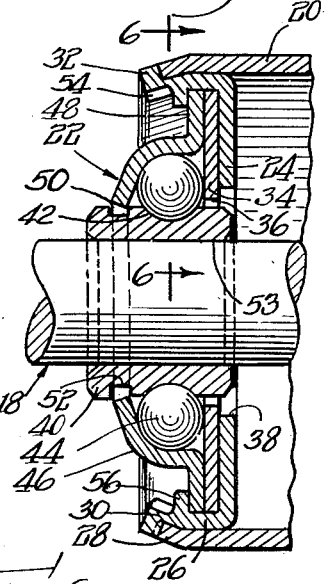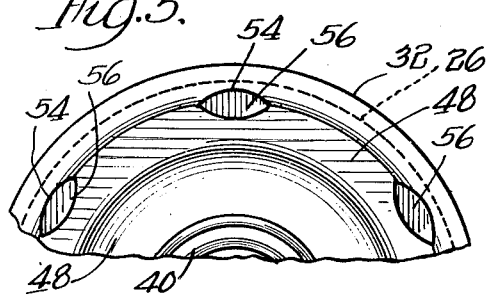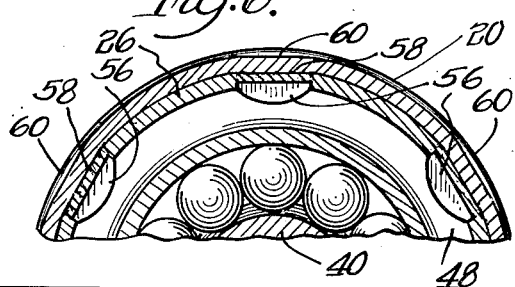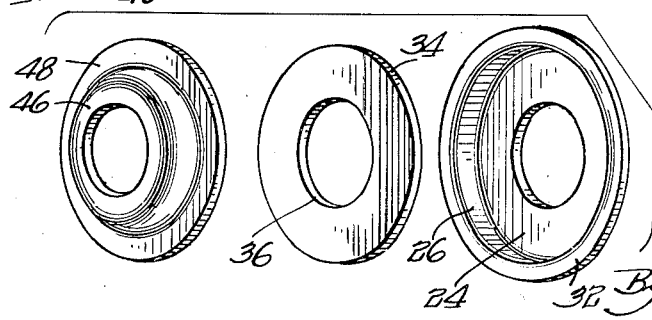

2,768,725

CONVEYOR ROLLER

Neil M. Foulds and Walter L. Harms, Sterling, Ill., assignors to Frantz Manufacturing Company, Sterling, Ill., a corporation of Illinois Application July 16, 1952, Serial No. 299,196

7 Claims. (Cl. 193—37)

The present invention relates to conveyors and the method of making them, and more particularly to the type of conveyor wherein a plurality of rollers is mounted between a pair of rails.

An object of the present invention is to provide a novel roller assembly for a conveyor of the above described type, which roller assembly includes a novel ball bearing assembly which may be economically manufactured and the method of making the novel roller assembly.

Another object of this invention is to provide a novel bearing assembly for a conveyor roller of the above type, wherein the various parts of the bearing assembly are held together in pre-assembled relationship without the use of separate or auxiliary fastening means, such as rivets or the like.

A more specific object of the present invention is to provide a conveyor roller having a novel bearing assembly of the above described type, wherein the bearing assembly is provided with a shell which is shaped to contain the various elements of the bearing in pre-assembled relationship and, in addition, to prevent relative rotation between the shell and the roller after the roller has been applied to the shell.

Still another object of the present invention is to provide a novel method for manufacturing conveyor rollers of the above type, wherein the shell of the roller bearing is first deformed or staked to retain the bearing in pre-assembled relationship after which the roller is crimped or pressed onto the bearing shell, which pressing action also causes a deformation of the shell, whereby the bearing assembly is made much stronger and in effect an integral part of the roller.

Other objects and advantages will be apparent from the following description and the accompanying drawings, wherein:

Fig. 1 is a perspective view, showing a conveyor utilizing the rollers of this invention;

Fig. 2 is a vertical cross section, showing the elements of the novel bearing of this invetnion in an initial stage of assembly;

Fig. 3 is similar to Fig. 2, and in addition shows the bearing shell staked to retain the bearing in pre-assembled relationship and the roller in its initial stage of assembly with the bearing;

Fig. 4 is a vertical cross section, showing the roller and the bearing of this invention in their final assembled relationship;

Fig. 5 is a partial cross section taken along line 5—5 in Fig. 3;

Fig. 6 is a fragmentary cross section taken along line 6—6 in Fig. 4; and

Fig. 7 is an exploded perspective view, showing the bearing shell, the ball retainer, and the ball race.

Referring now more specifically to the drawings, wherein like elements are designated by the same numerals throughout the various figures, Fig. 1 shows a conveyor 10, which includes the novel rollers of this invention. The conveyor 10 includes a pair of spaced parallel side rails 12 and 14, which in the embodiment shown are straight pieces of channel iron. If desired, the rails may be made of other shapes and may be curved. A plurality of rollers 16 is carried by spaced shafts 18, which shafts are journaled in the side rails.

Referring now to Fig. 4, each of the rollers 16 includes an elongated hollow tube 20 having at the ends thereof a bearing assembly 22. The tube 20 may be constructed of metal, such as steel or any other suitable material. While only the lefthand end of the tube, as seen in Fig. 4, is shown, it is clear that the other end, or righthand end, may be provided with a bearing assembly which is similar or identical to the bearing assembly 22.

The bearing assembly 22 includes a bearing shell 24, which is preferably fabricated from relatively soft steel. The shell 24 includes an annular flange 26 which extends substantially normally from the peripheral edge of the shell 24, or, in other words, the flange 26 extends longitudinally of the tube 20. The flange 26 has an outside diameter which is substantially equal to the inner diameter of the tube 20 so that the shell 24 may be inserted within the tube with a relatively tight fit. The terminal end of the tube 20 is crimped or pressed inwardly, as at 28. This action also inwardly crimps the flange 26, as at 30, whereby the bearing assembly is retained within the tube. In order to limit the distance which the bearing may be inserted within the tube, the terminal free edge of the flange 26 is turned radially outwardly to form an abutment flange 32.

Within this shell of the bearing, there is positioned a washer or ball retainer 34, which is preferably constructed of hardened steel. The ball retainer 34 is provided with a central aperture 36, which is aligned with the aperture 38 of the shell to accommodate the axle 40 of the bearing. The diameter of the aperture 36 in the retainer 34 is only slightly greater than the outer diameter of the axle 40 in order to allow for a slight play of the axle without frictional contact. The axle 40 is provided with a ball race 42 adapted to receive a plurality of hard steel bearing balls 44. A ball race 46 is disposed to cover the balls and terminates in a radially extending annular flange 48, which flange abuts against the retaining member 34. The mid portion of the ball race 46 is provided with a central aperture 50 having a diameter substantially the same as the outer diameter of the bearing axle 40, but sufficiently larger to allow close sliding contact between the ball race 46 and the axle. The peripheral edge of the ball race 46 surrounding the aperture 50 is in alignment with the annular groove 52 formed in the surface of the axle 40. The groove 52 preferably has a length longitudinally of the axle which is greater than the thickness of the material forming the ball race 46. The groove thus forms a trap for preventing dirt or foreign material from entering the bearing or for preventing grease or oil from escaping from the bearing while at the same time allowing some play between the axle and the ball race 46. The provision of the groove 52 is optional and forms no part of this invention. The axle 40 is provided with a central longitudinally extending aperture 53 which is adapted to receive the shaft 18. Preferably, the axle 40 and the ball race 46 are also made of hardened steel. If desired, the aperture 53 may be made non-circular in cross section to receive a similarly shaped shaft 18 to prevent rotation between these parts.

A feature of this invention resides in the novel method and means for retaining the several elements of the bearing 22 in pre-assembled relationship with the bearing housing 24. In Fig. 2, the bearing is shown in an initial stage of assembly. It should be noted that at this stage the annular flange 26 of the housing has not yet been crimped or pressed inwardly, as shown at 30 in Fig. 4, and, therefore, the housing member 24 presents an open cup-shaped housing into which the retaining member 34 and the ball race 46 may be inserted, as shown in Fig. 2. It should be noted that the outer diameters of the retaining member and the ball race 46 are substantially equal to the internal diameter of the flange 26 so that the balls and the axle 40 are held substantially centrally of the housing 24. After the bearing elements are assembled, as shown in Fig. 2, the relatively soft material of the flange 26 of the housing 24 is staked at a plurality of points 54 to provide locking or holding lugs 56 which bear against the outer surface of the peripheral flange 48 of ball race 46, thus to lock or retain the bearing elements in pre-assembled relationship with the housing 24. Preferably, the flange 26 is staked to provide six locking lugs 56 spaced evenly about the housing. However, it is clear that a different number of locking lugs 56 may be successfully utilized. Fig. 5 illustrates how the locking lugs 56 are formed by cutting away the material of the flange 26 for a substantial thickness thereof. With the bearing assembled and staked, it is then inserted within the end of the roller tube 20, as shown in Fig. 3. The assembly is then subjected to a suitable crimping or rolling action to crimp the terminal ends of the tube and the flange 26 inwardly, as described above and shown at 28 and 30 in Fig. 4. This crimping action not only locks the bearing within the end of the tube, but it also forces the locking lugs or tabs 56 firmly against the flange 48 of the ball race 46, whereby a very rugged and rigid assembly is effected. It should also be noted that the above described staking action causes the outer peripheral surface of the flange 26 to be flattened, as shown best at 58 in Fig. 6. This flattening is a result of the forming of the material between the staking tool and a suitable backup tool, not shown. Thus, when the end of the tube 28 is pressed and crimped against the flange 26, the tube is slightly flattened, as at 60, since the material of the tube tends to conform with the configuration of the surface of the flange 26. These aligned flattened areas 58 on the bearing housing and 60 on the tube interlock with each other to help prevent relative rotation between the bearing housing 24 and the roller tube 20.

From the foregoing description, it is seen that the present invention provides a simple bearing which may be readily assembled and held in such pre-assembled relationship by means of a simple staking operation, which staking operation also forms locking surfaces on the peripheral surface of the bearing housing which interlock with the roller tube to prevent relative rotation between the tube and the housing. Furthermore, it is seen that during the rolling or pressing operation which crimps the ends of the tube and the housing flange together, the staked locking tabs are firmly urged inwardly rigidly to retain the bearing elements in assembled relationship, and the roller tube is simultaneously formed with flattened locking surfaces which cooperate with the above mentioned locking surfaces on the bearing housing. It is further seen that the present invention has provided an extremely simple conveyor roller, wherein not only are all of the elements of the bearing retained together without the use of separate or auxiliary fastening means, such as rivets, but also the roller tube is rigidly affixed to the bearing without the use of auxiliary fastening elements.

While the preferred embodiment of this invention has been shown and described herein, it is obvious that numerous changes can be made in the structural details thereof. For example, the hardened steel ball retainer 34 could be eliminated, and the inner radially extending portions of the housing member 24 could be hardened to receive the wear from the bearing balls. In view of this and other changes which may be made, it is intended that the present invention should not be limited by the specific structure disclosed, but rather only by the claims appended hereto.

We claim:

1. A roller, including an axle, a bearing element housing surrounding said axle, said housing comprising at least two housing members extending generally radially from said axle, said housing members having inner portions adjacent said axle spaced longitudinally of the axle to form an annular space adapted to retain a plurality of bearing elements, one of said housing members having peripheral annular flange means extending generally axially of said axle, the other of said housing members having an outer portion disposed within and adjacent said flange means, integral means staked from said flange means and interlocking with the outer portion of said other housing member for holding the housing members in assembled relationship, and a roller member having an annular end portion closely surrounding said flange means, said end portion and at least a part of said flange means being crimped inwardly to prevent longitudinal relative displacement between said roller member and said housing members, said annular end portion and said annular flange means having aligned flattened interlocking areas for restraining relative rotation between said roller member and said housing members.

2. The method of assembling a roller from a bearing assembly having a housing member which includes a peripheral annular flange means extending axially of the bearing assembly and having a second flange means extending radially outwardly therefrom and a second housing member having a peripheral edge disposed within and adjacent said peripheral flange means and a roller member, comprising staking portions of said annular flange means to provide lugs cooperating with the peripheral edge of said second housing members to hold said housing members in pre-assembled relationship, substantially simultaneously flattening areas of said annular flange means, placing an annular end portion of said roller member over said annular flange means and abutting said second flange means, crimping said annular end portion of said roller member and at least a portion of said annular flange means inwardly to lock said bearing assembly against longitudinal displacement relative to said roller member, said crimping substantially simultaneously flattening areas of said annular end portion into interlocking engagement with the flattened areas of the flange means to restrain relative rotation between said roller member and said bearing assembly and substantially simultaneously forcing said lugs against said second housing member to provide a rigid bearing housing assembly.

3. A roller assembly comprising an inner race, a plurality of bearing elements disposed around said inner race, a pair of bearing element retaining members having aligned apertures therein to accommodate said inner race and hold said bearing elements about said inner race, one of said bearing element retaining members having a peripheral flange extending generally axially of said inner race and overlying the outer periphery of the other bearing element retaining member, said flange having a portion of the material on the inner periphery thereof deformed to provide a lug contacting said other bearing element retaining member and holding the two bearing element retaining members in assembled relationship, and an outturned flange formed on a free edge of said first mentioned flange.

4. A roller comprising an inner race, a plurality of bearing elements disposed about said inner race, a pair of retaining members having aligned apertures therein to accommodate said inner race and hold said bearing elements against said inner race, an annular shell encircling said retaining members and extending in the direction of the axis of said inner race, a first inturned flange formed on one edge of said shell and extending inwardly and contacting one of said retaining members, a lug formed from the inner periphery of said shell and contacting the other of said retaining members, said lug and first flange cooperating to hold said retaining members in assembled relationship about said bearing elements and said inner race, and an outturned flange formed on the other edge of said shell and extending outwardly therefrom.

5. A roller comprising an inner race, a plurality of bearing elements disposed about said inner race, a pair of retaining members having aligned apertures therein to accommodate said inner race and hold said bearing elements against said inner race, an annular shell encircling said retaining members and extending in the direction of the axis of said inner race, a first inturned flange formed on one edge of said shell and extending inwardly and contacting one of said retaining members, a lug formed from the inner periphery of said shell and contacting the other of said retaining members, said lug and first flange cooperating to hold said retaining members in assembled relationship about said bearing elements and said inner race, an outturned flange formed on the other edge of said shell, and an annular tube surrounding said shell with the free end of the tube disposed against said outturned flange, at least a portion of said shell and said outturned flange and the end of said tube being crimped inwardly to retain said shell and associated parts in assembled relationship with said tube.

6. A roller assembly comprising an inner race, a plurality of bearing elements arranged around said inner race, a first retaining member and a second retaining member disposed about said inner race and said bearing elements to hold said bearing elements about said inner race, said first retaining member being in the form of a flat circular plate having an aperture therein to accommodate said inner race, said second retaining member including a curved portion extending around said bearing elements and an outwardly extending flange portion contacting said first retaining member, an annular shell encircling the outer periphery of said retaining members and extending in a direction axially of said inner race, one edge of said shell having an inturned flange contacting and supporting said first retaining member, a lug formed from the inner periphery of said shell and contacting the flange portion of said second retaining member so that said retaining members are clamped between said lug and said inturned flange of said shell, and an outturned flange formed on the other edge of said shell.

7. A roller comprising an inner race, a plurality of bearing elements arranged around said inner race, a first retaining member and a second retaining member disposed about said inner race and said bearing elements to hold said bearing elements about said inner race, said first retaining member being in the form of a flat circular plate having an aperture therein to accommodate said inner race, said second retaining member including a curved portion extending around said bearing elements and an outwardly extending flange portion contacting said first retaining member, an annular shell encircling the outer periphery of said retaining members and extending in a direction axially of said inner race, one edge of said shell having an inturned flange contacting and supporting said first retaining member, a lug formed from the inner periphery of said shell and contacting the flange portion of said second retaining member so that said retaining members are clamped between said lug and said inturned flange of said shell, an outturned flange formed on the other end of said shell, and an annular tube encircling said shell with the free end of the tube abutting the outturned flange of the shell, at least a portion of the shell and the outturned flange of the shell and the adjacent end of the tube being crimped inwardly to retain said shell and associated parts in assembled relationship with said tube.

References Cited in the file of this patent

UNITED STATES PATENTS

| 1,445,821 | Buck | Feb. 20, 1923 |
| 1,500,516 | Morton | July 8, 1924 |
| 1,609,968 | Schroeder | Dec. 7, 1926 |
| 1,720,255 | Adams | July 9, 1929 |
| 2,136,531 | Vogt | Nov. 15, 1938 |
| 2,376,779 | Kendall | May 22, 1945 |

FOREIGN PATENTS

| 428,077 | Great Britain | May 7, 1935 |